3,592,797
Patented July 13, 1971

3,592,797
CLEAR, VIRTUALLY COLORLESS POLYETHYLENE TEREPHTHALATE
William M. Dunbar, Village of Cottage Grove, Minn., assignor to Minnesota Mining and Manufacturing Company, St. Paul, Minn.
No Drawing. Continuation-in-part of abandoned application Ser. No. 755,819, Aug. 28, 1968. This application June 9, 1969, Ser. No. 831,749
Int. Cl. C08g 17/04, 17/003
U.S. Cl. 260—75                 5 Claims

ABSTRACT OF THE DISCLOSURE

Clear and virtually colorless resin such as is obtained by polymerizing dimethyl terephthalate or terephthalic acid and ethylene glycol with catalytic amounts of zinc acetate and trimethylolpropane. Biaxially oriented film of the polymer is likewise clear and virtually colorless and especially useful as a photographic film base.

CROSS REFERENCE

The present application is a continuation-in-part of my copending application Ser. No. 755,819, filed Aug. 28, 1968 and now abandoned.

BACKGROUND OF THE INVENTION

Biaxially oriented polyethylene terephthalate film has such outstanding physical properties that it has come into widespread use for a great variety of commercial applications. Its high strength and toughness, dimensional stability and resistance to heat and chemical attack have made it dominant as backing for magnetic recording tape. Its fairly good clarity in thin films makes it useful in packaging and stationery applications. However, use as a photographic film base has been limited because the necessarily heavier thicknesses tend to have an objectionable degree of haziness and color.

Some progress has previously been realized toward making polyethylene terephthalate more clear and colorless, e.g., by carrying out the polymerization in the complete absence of oxygen or by reducing the catalyst concentration. This is readily accomplished in laboratory experiments, but in large scale commercial equipment some leakage of air seems to be inevitable, and larger proportions of catalyst are generally required. It is also known that a reduction in the temperature of polymerization generally provides correspondingly clearer, less colored resin, but this slows the polymerization process and thus increases the time of exposure to by-product forming reactions. If the amount of catalyst is increased to speed up the process, undesirable side reactions become more prevalent.

Catalysts for polymerizing polyethylene terephthalate tend to impart color in varying degrees and in some cases reduce the degree of light transmission of the polymer. For example, the widely used antimony compounds often are reduced during the polymerization and impart a grayish haze to the resin and to film made therefrom. This is believed to be due to the presence of a fine suspension of free antimony.

The relatively heavy thickness required for photographic film base has involved another problem in the application of polyethylene terephthalate film. A thickness of 4 mls (0.1 mm.) is typical for a motion picture film base and of 7 mils (0.18 mm.) is typical for an X-ray film base. Since it is common to orient the film by stretching it biaxially to at least three times its original dimension in both directions, one may start with amorphous film of about 40 mils (1 mm.) thickness to make a motion picture film base or with amorphous film of 70–80 mils (2 mm.) thickness to make X-ray film base. Since a higher degree of stretching provides higher strength film, one may wish to start with amorphous film of even greater thickness. Polyethylene terephthalate film is normally extruded directly upon a quenching drum in order to remain substantially amorphous until it is oriented by stretching, but the self-insulating nature of such thick films may result in a degree of crystallization which is not compatible with the intended stretching steps. To solve this problem, one must either improve the quenching process or find some other way to inhibit the crystallization.

A modified polyethylene terephthalate film of improved clarity is disclosed in U.S. Pat. No. 3,251,809 of Lockwood and Agre. The patent suggests that the improved clarity stems at least in part from the elimination of the slip agent which is generally used to permit the film to be wound upon itself into a wrinkle-free roll. Also, compared to conventional linear polyethylene terephthalate, polymerization may generally be effected in approximately two-thirds to one-half the time, thus reducing the time of exposure to leaking air. In these respects, the Lockwood et al. patent is a step in the direction toward photographic film needs.

SUMMARY OF THE INVENTION

The present invention concerns the polymerization of dimethyl terephthalate or terephthalic acid and ethylene glycol with about 0.25 weight percent (parts per 100 parts dimethyl terephthalate) of a polyhydroxy alcohol such as trimethylolpropane and about 0.025 weight percent of a soluble zinc salt such as zinc acetate. Although excess ethylene glycol is employed, the hydroxyl equivalent of the ethylene glycol plus polyhydroxy alcohol which enter into the polymerization approximately equals the carboxyl equivalent of the dimethyl terephthalate or terephthalic acid. In place of part or all of the ethylene glycol may be used any polymethylene glycol of the formula $HO-(CH_2)_n-OH$ wherein $n$ is an integer of 2–10 such as hexanediol-1,6 or cyclohexane-dimethanol-1,4. A small amount of the latter in admixture with ethylene glycol provided a polymer of the present invention which was characterized by unusually low degree of crystallinity. Also, part of the glycol may contain one or more ether groups.

In place of the polyhydroxy alcohol may be used one or more polyfunctional organic compounds having at least three groups consisting of carboxyl, hydroxyl and short-chain alkyl ester groups. Where the polymerization is carried out with dimethyl terephthalate rather than terephthalic acid, any carboxyl group in the polyfunctional compound should be preliminarily esterified, e.g., with ethylene glycol.

The reaction mixture should contain at least 0.05 weight percent and preferably at least 0.15 weight percent of trimethylolpropane (or a chemically equivalent amount of other polyfunctional organic compound) and at least 0.005 and preferably at least 0.01 weight percent of the soluble zinc salt in order to provide the rapid polymerization necessary to minimize exposure to leaking air and to insure that polymerization proceeds to suitably high molecular weight evidenced by intrinsic viscosity within the range of 0.5 to 0.7, and preferably within 0.55 to 0.65. On the other hand, the reaction mixture should not contain more than about 1.0 weight percent and preferably less than 0.75 weight percent of trimethylolpropane (or a chemically equivalent amount of other polyfunctional organic compound). Otherwise, biaxially oriented film made from the novel polymer would have less toughness and resistance to tear than is desired for most purposes. Amounts of zinc acetate or other soluble zinc salt exceeding about 0.05 weight percent produce a noticeable coloring and thus tend to defeat the primary objectives of the invention.

Extruded films of the polymer of this invention crystallize at a rate such that even at very heavy thicknesses (e.g., 100 mils, 2.5 mm., or even thicker), conventional quenching procedures are sufficient to guard against appreciable crystallization before the film can be oriented.

Ten percent of the dimethyl terephthalate has been replaced with each of dimethyl isophthalate, dimethyl sebacate and dimethyl 2,6-naphthalate in the production of polymer of the present invention providing film which can be oriented by stretching for such uses as photographic film backing. Larger amounts of these copolymerizable monomers may be employed to provide clear and virtually colorless polymers having diverse uses. For example, the polymer of the present invention has been modified by replacing one-half of the dimethyl terephthalate with dimethyl isophthalate to provide a copolymer of extraordinarily high clarity and absence of color having utility as clear, tough protective coatings or as adhesives.

A polymer prepared from 90% dimethyl terephthalate and 10% dimethyl 2,6-naphthalate was unusually tough and crystallized on heating more slowly than polymers prepared from 100% dimethyl terephthalate or from 90:10 mixtures of dimethyl terephthalate and dimethyl isophthalate or dimethyl sebacate.

Statements herein as to weight percent of polyfunctional organic compound and zinc catalyst are based on 100 parts of dimethyl terephthalate or terephthalic acid, including the amount of these copolymerizable isophthalate, sebacate or naphthalate monomers, or the corresponding acids, if employed in the reaction mixture.

EXAMPLE I 100 parts of dimethyl terephthalate, 80 parts of ethylene glycol, 0.25 part (weight percent) of trimethylolpropane and 0.025 part zinc acetate were charged into a stainless steel autoclave equipped with a stirrer and a packed column and heated with oil circulated through its jacket. To provide a relatively inert atmosphere, natural gas was subjected to incomplete combustion with a restricted amount of air, dried, compressed and passed into the autoclave to purge it of air. Slow agitation was begun and the autoclave was pressurized to 30 p.s.i.g. and heated to 170° C., the rate of agitation being sharply increased upon solution of the dimethyl terephthalate. During the next 75 minutes, the temperature gradually increased to 250° C., and 32 parts of methanol were fractionated from the reaction mixture.

The pressure was reduced to atmospheric over a period of 30 minutes, and during this period, the excess ethylene glycol was distilled off. A vacuum was applied, reaching 1.6 mm. of Hg after 135 minutes while the temperature increased to 280° C., with reduction in stirring speed to avoid overheating. The polymer, which was drained and cooled quickly, had an intrinsic viscosity of 0.62 (determined in a 60:40 weight percent solution of phenol:tetrachloroethane at 30° C.) and a melting point of 253° C.

The polymer was extruded into film by casting onto a chilled roll, and the film was first oriented by stretching longitudinally 3.25× over closely spaced rolls internally heated to 82° C. and then oriented by stretching crosswise 3.0× in a tenter at an air temperature of 86° C. The biaxially oriented film was heat-set at an air temperature of 205° C. and then cooled to ambient temperature before being released by the tenter. The product film was clear and virtually colorless in appearance and had the following properties:

Thickness: 2.20 mils (55.9 microns)
Lengthwise tensile at 5% elongation: 15,600 p.s.i.
Crosswise tensile at 5% elongation: 15,400 p.s.i.
Lengthwise tensile at break: 30,700 p.s.i.
Crosswise tensile at break: 29,100 p.s.i.
Lengthwise elongation at break: 128%
Crosswise elongation at break: 132%
Lengthwise shrinkage (149° C./15 min.): 1.8%
Crosswise shrinkage (149° C./15 min.): 2.5%
Lengthwise tear strength (ASTM D 1922-61T): 70.4 g.
Crosswise tear strength: 72.3 g.

The light transmission may conveniently be measured using a Spectronic 20 Colorimeter. The resin or film is broken or cut into small pieces to provide a 2.5-gram sample which is dissolved in 50 ml. of anhydrous trifluoroacetic acid with the assistance of mild heating as necessary, but not exceeding 50° C. The solution is filtered, and about 20 ml. is poured into a clean sample tube and about 20 ml. of pure anhydrous trifluoroacetic acid is poured into another sample tube to provide a reference. With the wavelength set at 3800 A. and the instrument calibrated to read 100% transmission through the reference tube, the percent transmission for the dissolved sample is determined. Resin and biaxially oriented film prepared as described in this example exhibit transmissions on the order of 93% and 83%, respectively.

The wavelength of 3800 A. is selected because many polyethylene terephthalate films now on the commercial market are yellowish in appearance and tend to absorb light at that wavelength.

The following examples were carried out in laboratory equipment on a much smaller scale than in Example I. As noted above, it is easier in laboratory equipment to control the temperature and to avoid leakage of air and thus avoid the formation of undesirable color bodies.

EXAMPLE II 100 parts of dimethyl terephthalate, 70 parts of ethylene glycol, 0.25 part of trimethylolpropane, and 0.025 part of zinc acetate dihydrate were charged to a 4-liter stainless steel autoclave equipped with an anchor-type scraping-wall agitator, thermometer well, inert gas inlet, and a packed distillation column. High purity nitrogen was passed into the vessel to provide an inert atmosphere.

Heat was applied by means of an electric heating mantle and stirring was begun as soon as the dimethyl terephthalate melted. At a batch temperature of about 160° C. methanol began to distill, and the theoretical amount was collected over a period of 1½ hours as the temperature was increased to about 225° C.

At this point, with a continuing sweep of nitrogen protecting the contents of the vessel, the distillation column was replaced by an adapter leading to a condenser and receiver for collecting glycol, and the temperature was raised to 250° C. over a period of about 20 minutes. Excess ethylene glycol distilled out at atmospheric pressure in this interval.

The pressure in the autoclave was then reduced gradually over a period of about ½ hour to 1 mm. of Hg or less while simultaneously increasing the batch temperature to 280° C. Polycondensation of the intermediate glycol ester was continued under these conditions (temperature=280°–286° C.; pressure=0.4–1.0 mm.) for about one hour with gradually diminishing distillation of by-product glycol and gradually reduced stirring speed as the viscosity of the polymer increased.

At the desired end point the vacuum was broken by introducing nitrogen to the system, the lid of the autoclave was removed, and the molten polyester which was clear and virtually colorless was poured into a stainless steel tray to cool and crystallize. It had an intrinsic viscosity of approximately 0.65 (determined at 30° C. in trifluoroacetic acid at a concentration of 0.5 gram per 100 ml. solution), and a melting point of 255°–258° C.

EXAMPLE III

The procedure of Example II was followed, except that 0.0133 part of basic zinc carbonate was used as the catalyst in place of the zinc acetate. Conditions of time and pressure were essentially the same, as was the final melt viscosity; the polycondensation temperature was somewhat lower (273°–276° C.). The product polyester was clear and virtually colorless. The melting point was 253°–255° C.

EXAMPLE IV

The procedure of Example II was followed, except that 0.192 part of pentaerythritol (M.P. 260°–262° C.) was used in place of the trimethylolpropane and the polycondensation temperature was lower (272°–275° C.). The product polyester was clear and colorless and the melting point was 252°–254° C.

EXAMPLE V

The procedure of Example II was followed again, except that 0.47 part of trimethyl trimesate (M.P. 145.5°–146° C.) was used in place of the trimethylolpropane. The polycondensation time was 45 minutes at a batch temperature of 282°–284° C. and pressure of about 0.5 mm. of Hg. The product polyester was clear and virtually colorless and the melting point was 252°–254° C.

EXAMPLE VI

Following the pocedure of Example II, except that the trimethylolpropane was replaced by 0.44 part of tetramethyl pyromellitate (M.P. 145°–146° C.), a polyester was produced in a polycondensation time of 50 minutes at a temperature of 280° C. and pressure of about 0.5 mm. It was clear and virtually colorless, and the melting point was 253°–255° C.

EXAMPLE VII

A polyester was produced following the procedure and reaction conditions of Example IV, except that the pentaerythritol was replaced by 0.407 part of trimethyl carballylate (B.P. 85° C. at 0.2 mm. of Hg; $n_D^{24.5}$ 1.4384). The polymer was clear and virtually colorless, and the melting point was 253°–255° C.

EXAMPLE VIII

The procedure of Example II was followed, except that the trimethylolpropane was replaced by an equivalent amount of the ethylene glycol ester of dimethylolpropionic acid. The desired melt viscosity was reached in one hour at a polycondensation temperature of 273°–278° C. and a pressure of 0.25–0.4 mm. of Hg. The finished polyester was clear and virtually colorless, and the melting point was 252°–255° C.

The glycol ester of dimethylolpropionic acid was used in place of the free acid because of the known inhibition of the glycolysis catalyst by the presence of acidic material. It was made by heating a known weight of dimethylolpropionic acid with an excess of ethylene glycol until the theoretical amount of water of esterification was collected. The amber solution of glycol ester was diluted with methanol, decolorized with activated carbon and filtered in a manner to minimize loss of product. From the measured volume of the filtrate an appropriate aliquot was taken to provide the calculated requirement of propionate ester.

Film of the present invention of relatively heavy thickness requires no slip agent to permit winding upon itself into a roll. However, if very thin (e.g., one mil, 25 microns, or less), a small amount of slip agent may be employed, and the film still appears clear and virtually colorless. Other additives which do not destroy the clear colorless nature may be added to the novel polymer, such as absorbers of ultraviolet light.

It is often desired that X-ray film have a blue color. The clear and virtually colorless polymer produced in the practice of the present invention permits film products to be dyed by known techniques to the precisely desired color while retaining a high degree of light transmissivity. The novel polymer may also be colored for other purposes. For example, an aluminum-vapor-coated film of the present invention which is dyed yellow has a brilliant gold decorative appearance when viewed from the uncoated side.

Filaments of the novel polymer can be cold drawn to provide high-strength yarns and fibers in the same manner as ordinary polyethylene terephthalate.

What is claimed is:

1. A clear and virtually colorless polyethylene terephthalate polymer of 0.5 to 0.7 intrinsic viscosity produced from
   (a) terephthalic acid or dimethyl terephthalate, up to one-half of which may be replaced by dimethyl isophthalate, dimethyl sebacate, dimethyl 2,6-naphthalate or a corresponding acid,
   (b) excess glycol of the formula HO—(CH$_2$)$_n$—OH wherein $n$ is an integer of 2–10,
   (c) about 0.05 to 1.0 weight percent of a polyfunctional compound having at least three reactive groups consisting solely of carboxyl, hydroxyl, and lower alkyl esters, and
   (d) as essentially the sole catalyst about 0.005 to 0.05 weight percent of a zinc salt which is soluble in the reaction mixture.

2. A clear and virtually colorless polyethylene terephthalate polymer of 0.5 to 0.7 intrinsic viscosity produced from
   (a) terephthalic acid or dimethyl terephthalate,
   (b) excess ethylene glycol,
   (c) about 0.05 to 1.0 weight percent of a polyhydroxy alcohol, and
   (d) as essentially the sole catalyst about 0.01 to 0.05 weight percent of a zinc salt which is soluble in the reaction mixture.

3. A clear and virtually colorless polymer of 0.55 to 0.65 intrinsic viscosity produced from
   (a) dimethyl terephthalate,
   (b) excess ethylene glycol,
   (c) about 0.25 weight percent of trimethylolpropane, and
   (d) as essentially the sole catalyst about 0.025 weight percent of zinc acetate.

4. A clear and virtually colorless biaxially-oriented film of the polymer defined in claim 1.

5. Process of making clear and virtually colorless polyethylene terephthalate polymer comprising the steps of charging into an autoclave
   (a) terephthalic acid or dimethyl terephthalate, up to one-half of which may be replaced by dimethyl isophthalate, dimethyl sebacate, dimethyl 2,6-naphthalate or a corresponding acid,
   (b) excess glycol of the formula HO—(CH$_2$)$_n$—OH wherein $n$ is an integer of 2–10,
   (c) about 0.05 to 1.0 weight percent of a polyfunctional compound having at least three reactive groups consisting solely of carboxyl, hydroxyl and lower alkyl esters, and
   (d) as essentially the sole catalyst about 0.005 to 0.05 weight percent of a zinc salt which is soluble in the reaction mixture, and heating the charge while substantially excluding air until a polyethylene terephthalate polymer of 0.5 to 0.7 intrinsic viscosity is obtained.

References Cited

UNITED STATES PATENTS 3,251,809   5/1966   Lockwood et al. _____ 260—75

FOREIGN PATENTS 753,880   8/1956   Great Britain.
1,153,897   9/1953   Germany.

WILLIAM H. SHORT, Primary Examiner

M. GOLDSTEIN, Assistant Examiner